United States Patent [19]
Yamada

[11] Patent Number: 5,635,954
[45] Date of Patent: Jun. 3, 1997

[54] MOUSE CURSOR CONTROL SYSTEM

[75] Inventor: Yoichi Yamada, Chiba, Japan

[73] Assignee: Fujitsu Limited, Kawasaki, Japan

[21] Appl. No.: 732,653

[22] Filed: Jul. 19, 1991

[30] Foreign Application Priority Data

Jul. 20, 1990 [JP] Japan ................ 2-193714

[51] Int. Cl.⁶ ........................ G09G 5/08
[52] U.S. Cl. .................... 345/157; 345/163
[58] Field of Search ................ 340/706, 709, 340/710; 345/163, 157, 156, 160

[56] References Cited

U.S. PATENT DOCUMENTS

| | | | |
|---|---|---|---|
| 4,101,879 | 7/1978 | Kawaji et al. | 340/709 |
| 4,654,648 | 3/1987 | Herrington et al. | 340/709 |
| 4,847,605 | 7/1989 | Callahan et al. | 340/709 |
| 4,881,064 | 11/1989 | Nishino | 340/709 |
| 4,896,291 | 1/1990 | Gest et al. | 340/709 |
| 4,987,411 | 1/1991 | Ishigami | 340/709 |

FOREIGN PATENT DOCUMENTS

| | | |
|---|---|---|
| 59-34410 | 9/1985 | Japan .............. 340/710 |
| 63-301320 | 12/1988 | Japan . |
| 64-009517 | 1/1989 | Japan . |
| 1175021 | 7/1989 | Japan . |
| 2231619 | 9/1990 | Japan . |

*Primary Examiner*—Richard Hjerpe
*Assistant Examiner*—Amare Mengistu
*Attorney, Agent, or Firm*—Greer, Burns & Crain, Ltd.

[57] ABSTRACT

A display screen is divided into a plurality of split screens and a mouse equipped with a switch moves a cursor among the plurality of split screens. A first position of the mouse is memorized when the switch is depressed. A cursor is moved to a predetermined position in the split screen belonging to a predetermined scope of the distance of movement if the mouse is moved from the first position to a second position when the switch is released.

3 Claims, 6 Drawing Sheets

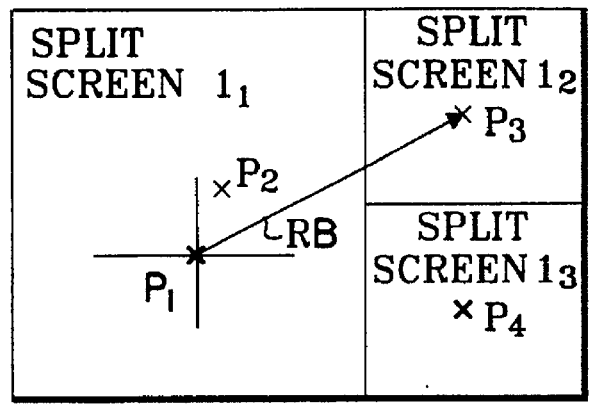
Fig. 4
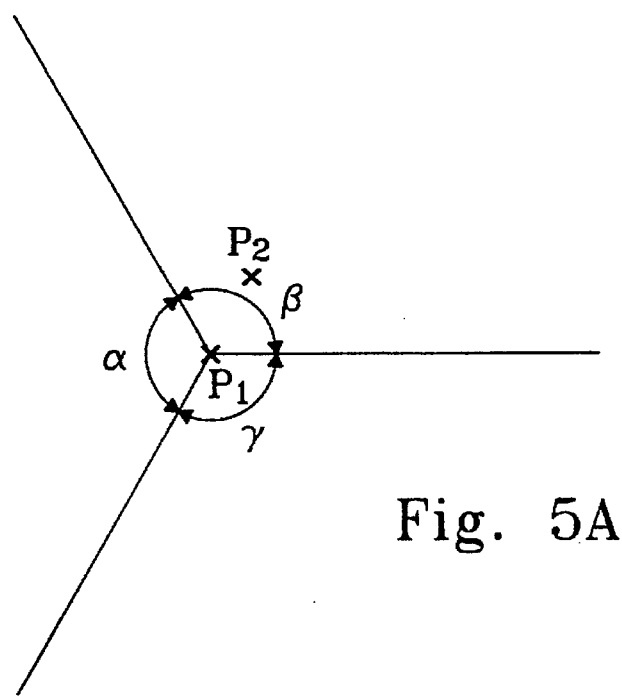
Fig. 5A
| SPLIT SCREEN | STARTING ANGLE | ENDING ANGLE | X | Y | |
|---|---|---|---|---|---|
| SPLIT SCREEN $1_1$ | $\alpha$ (120 | 240) | ($X_1$ | $Y_1$) | |
| SPLIT SCREEN $1_2$ | $\beta$ ( 0 | 120) | ($X_2$ | $Y_2$) | $P_3$ |
| SPLIT SCREEN $1_3$ | $\gamma$ (240 | 360) | ($X_3$ | $Y_3$) | $P_4$ |
Fig. 5B

MOUSE CURSOR CONTROL SYSTEM

BACKGROUND OF THE INVENTION

This invention pertains to a mouse cursor control system and in particular to one for quickly moving a cursor among split screens in a display device.

Recently, systems, such as CAD (computer aided design) systems, handling graphics on display screens have become wide spread.

New efficient input means replacing conventional keyboard input systems have been developed for the interfaces between such systems and human beings, i.e. GUI's (graphic user interfaces).

Therefore, a GUI system for inputting information using a display screen and a tablet has been developed.

The GUI system using the tablet is to input information by having a user point to the desired one of the menus displayed on a display screen with a tablet.

Meanwhile, recent work stations and personal computers widely use methods of inputting information by using a mouse, as a pointing device, and point menus on the display screens. The mouse is used to move a cursor on a display screen to a desired position and to select one of the menus.

In such a system using a mouse, in order to interlock the moves of the mouse with those of the cursor, a cursor needs to be moved on the display screen in correspondence with the distance and direction of movement of the mouse.

Such a conventional GUI system using a mouse configures a cursor to be moved in a corresponding direction (angle) to the movement of the mouse and over a distance in a predetermined ratio with the mouse distance of movement, so that the moves of the mouse and those of the cursor are interlocked.

The ratio between the mouse moving distance and the cursor moving distance is determined to attain the best operability based on ergonomics. That is, if the above ratio is too large, a minor mouse move causes the cursor to move too far, which makes it difficult to point to the desired position. On the other hand, if it is too small, the mouse needs to be moved around over a long range, which causes the operability to deteriorate. Thus, the ratio is chosen so that appropriate mouse moves adequately cover the cursor moves over the entire display screen.

Thus, an application in which a cursor frequently moves back and forth between the menu region provided at a margin of the display screen and the other graphic region has a problem of inferior operability because of cumbersome cursor moves necessitated by comparatively longer distance moves of the mouse.

SUMMARY OF THE INVENTION

This invention aims at solving the above problem and realizing a mouse cursor control method having a superior operability in moving a mouse cursor quickly over a long distance with a substantially smaller movement of the mouse.

A feature of the present invention resides in a mouse cursor control system for use in a display device in which a display screen is divided into a plurality of split screens and a mouse equipped with a switch means moves a cursor among the plurality of split screens, the mouse cursor control system comprising means for memorizing a first position of the mouse when the switch means is depressed and means for moving a cursor to a predetermined position in the split screen belonging to a predetermined scope of the distance of movement if the mouse is moved from the first position to a second position when the switch means is released.

BRIEF DESCRIPTION OF THE DRAWINGS

FIGS. 4 and 5A explain the actions of the embodiment of this invention;

FIG. 5B shows data structure stored in a memory; and

DESCRIPTION OF THE PREFERRED EMBODIMENT

Figure 1A:
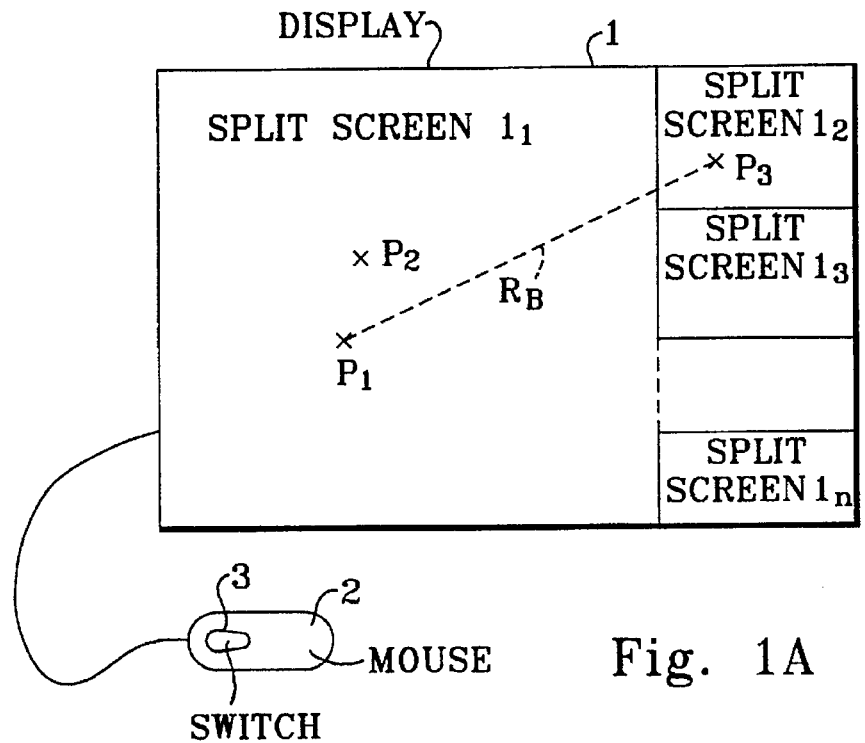
FIGS. 1A through 1C illustrate the principle of this invention.
Figure 1B:
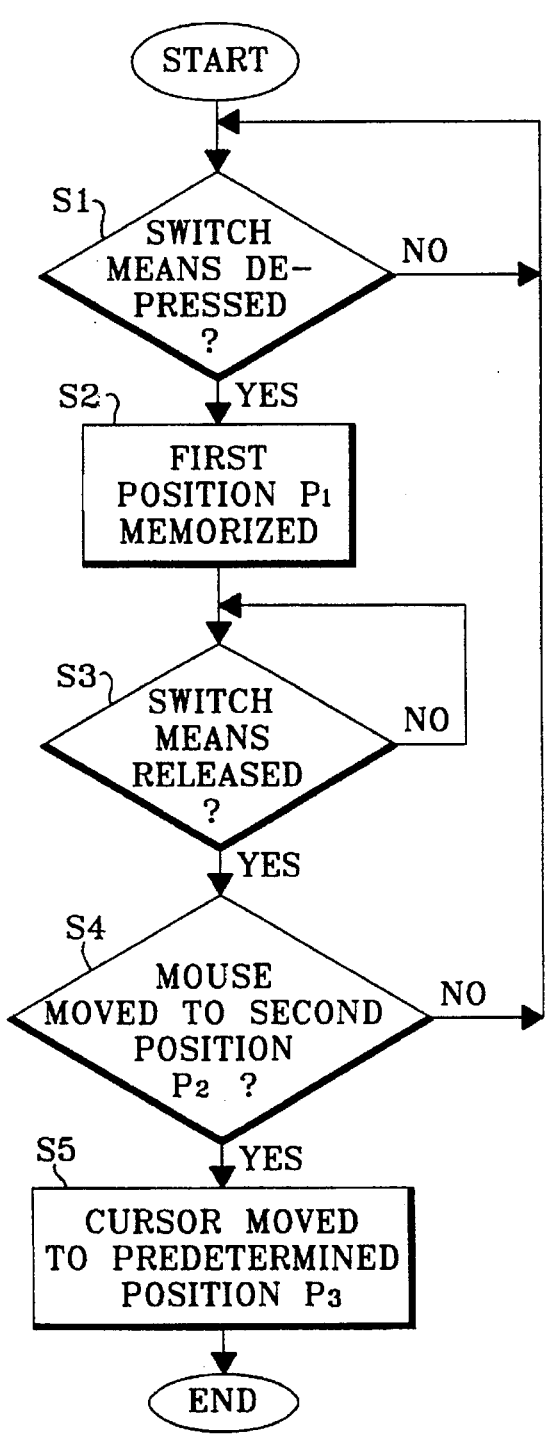
Figure 1C:
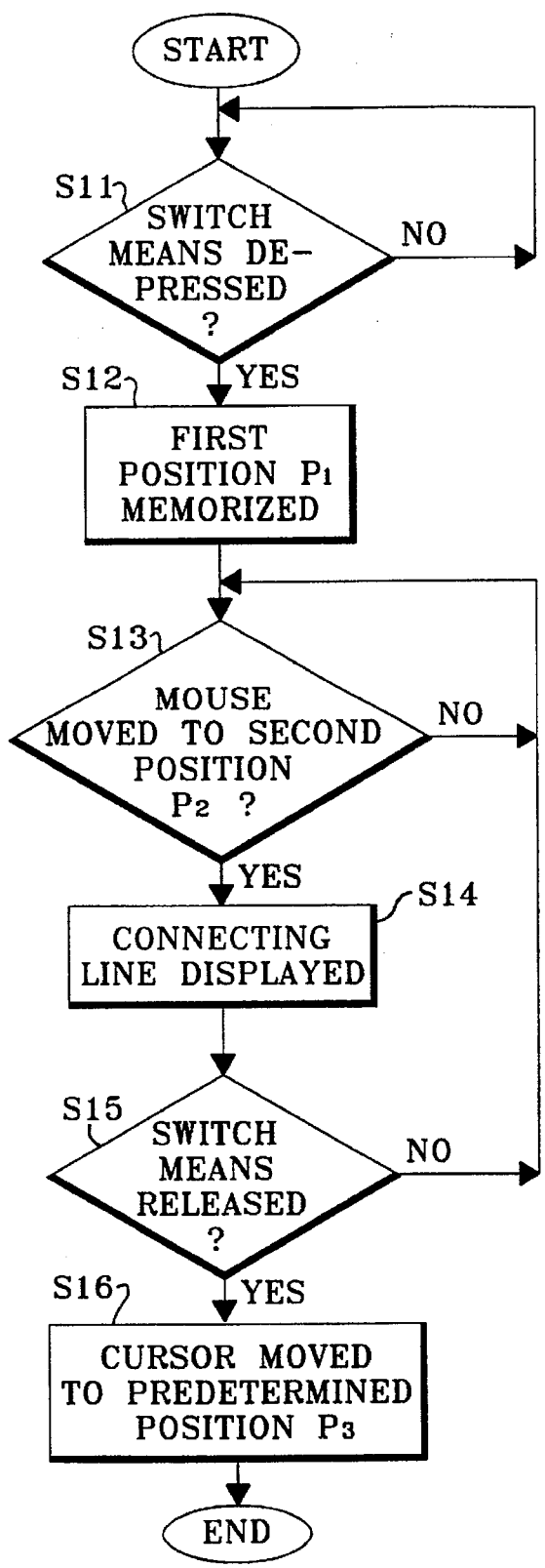

FIGS. 1A through 1C illustrate the principle of this invention.

A feature of this invention for achieving the above object resides in a mouse cursor control method for use in a display system, shown in FIG. 1A, in which a display screen 1 is divided into a plurality of split screens $1_1$ through $1_n$ and a mouse 2 equipped with a switch means 3 moves a cursor among the plurality of split screens $1_1$ through $1_n$. As shown in FIG. 1B, the mouse cursor control method has a step of memorizing a first position $P_1$ of the mouse 2 (S2) when the switch means 3 is depressed (S1) and a step of moving a cursor to a predetermined position $P_3$ in the split screen belonging to a predetermined scope of the direction of movement (S5) if the mouse 2 is moved from the first position $P_1$ to a second position $P_2$ (S4) after the switch means 3 is released (S3).

Accordingly, this eliminates the necessity of moving a cursor to the target split screen by moving a mouse over a long distance. Since the cursor is moved to a predetermined position of a target split screen after the cursor moving direction is determined by a little mouse move and a release of the switch means, the mouse needs to be moved over a short range and the operability improves by expediting the cursor move.

Another feature of this invention for achieving the same object resides in a mouse cursor control method for use in a display system, shown in FIG. 1A, in which a display screen 1 is divided into a plurality of split screens $1_1$ through $1_n$ and a mouse 2 equipped with a switch means 3 moves a cursor among the plurality of split screens $1_1$ through $1_n$. As shown in FIG. 1C, the mouse cursor control method has a step of memorizing a first position $P_1$ of the mouse 2 (S12) when the switch means 3 is depressed (S11) and a step of displaying a line RB connecting the first position $P_1$ with a predetermined position $P_3$ on the split screen belonging to a predetermined scope of the moving direction, when the mouse 2 is judged to move from the above first position $P_1$ to the second position $P_2$ (S13) and a step of moving a cursor to a predetermined position ($P_3$) (S16) in the split screen pointed by the line RB (S14), when the switch means 3 is released (S15).

Accordingly, this eliminates the necessity of moving a cursor over a long distance to the target split screen by moving a mouse over a long range. Since the cursor is moved to a predetermined position of a target split screen after the cursor moving direction is determined by a little mouse move, when e.g. a rubber band image line RB is displayed to the predetermined position of the split screen in the direction in which a cursor is moved, and by a release of the switch means, the mouse needs to be operated only a little bit and the operability improves by expediting the cursor move corresponding to the mouse move and by enabling the confirmation of the cursor moving position.

Figure 2:
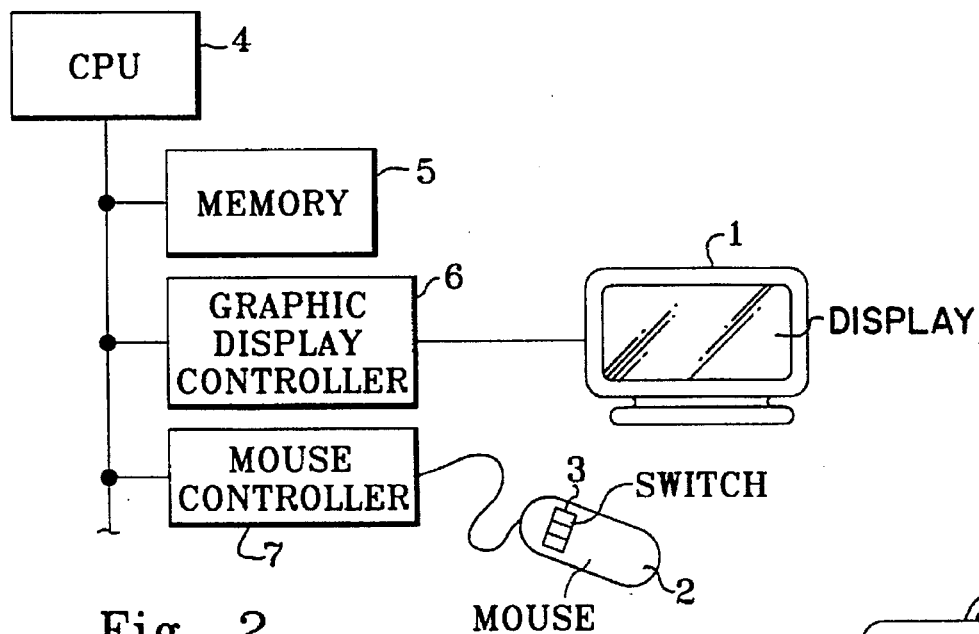
FIG. 2 shows the configuration of an embodiment of this invention.

FIG. 2 shows an embodiment of a display system implemented with the mouse cursor control system of this invention shown in FIGS. 1A through 1C.

In FIG. 2, the same or equivalent parts as those shown in FIG. 1 have the same numbers. 1 is a graphic display unit. The screen of the graphic display unit 1 is divided e.g. into three (3) screens (split screens) with regions $1_1$ through $1_3$ as shown in FIG. 4. Screens $1_1$, $1_2$ and $1_3$ are respectively used for the graphic region, a menu region and another menu region.

Figure 3:
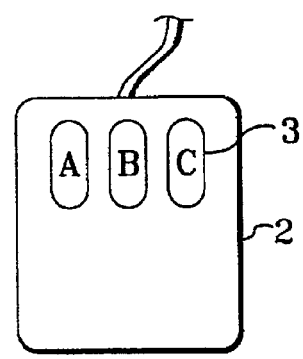
FIG. 3 illustrates the mouse used in the embodiment of this invention.

A mouse 2 is provided for use as a pointing device. A button 3 is provided on its top surface. The button 3 is configured e.g. by three (3) buttons A, B and C such as shown in FIG. 3.

Button A is for hitting in normal operations. Screen $1_1$ for graphic region uses Button A for various operations such as drawing, moving and erasing a graphic. The desired items are selected on the menu screens $1_2$ and $1_3$.

Button B is for moving the cursor, which is related to a feature of this invention. The usage of button B will be elaborated later. Button C is for special uses. Since is it is not directly related to this invention, it is not explained in detail.

In FIG. 2, 4 is a central processing unit (hereafter CPU), which controls not only the above graphic display unit 1 and the mouse 2 but also the entire display system, per the control program memorized in a memory 5.

The memory 5 is configured e.g. by a ROM and/or a RAM. The memory 5 memorizes data necessary for driving the system such as the above control program and includes a buffer region necessary for the operation.

A graphic display controller 6 is provided for controlling the display of the screen of the above described graphic display unit 1 based on the control signal from the CPU 4. The control of the screen display includes controls of ordinary graphics and menu displays as well as of the cursor display.

A mouse controller 7 is provided for transmitting to the CPU 4 the information generated in correspondence with buttons A, B and C as well as moves of the mouse 2.

Figure 6A:
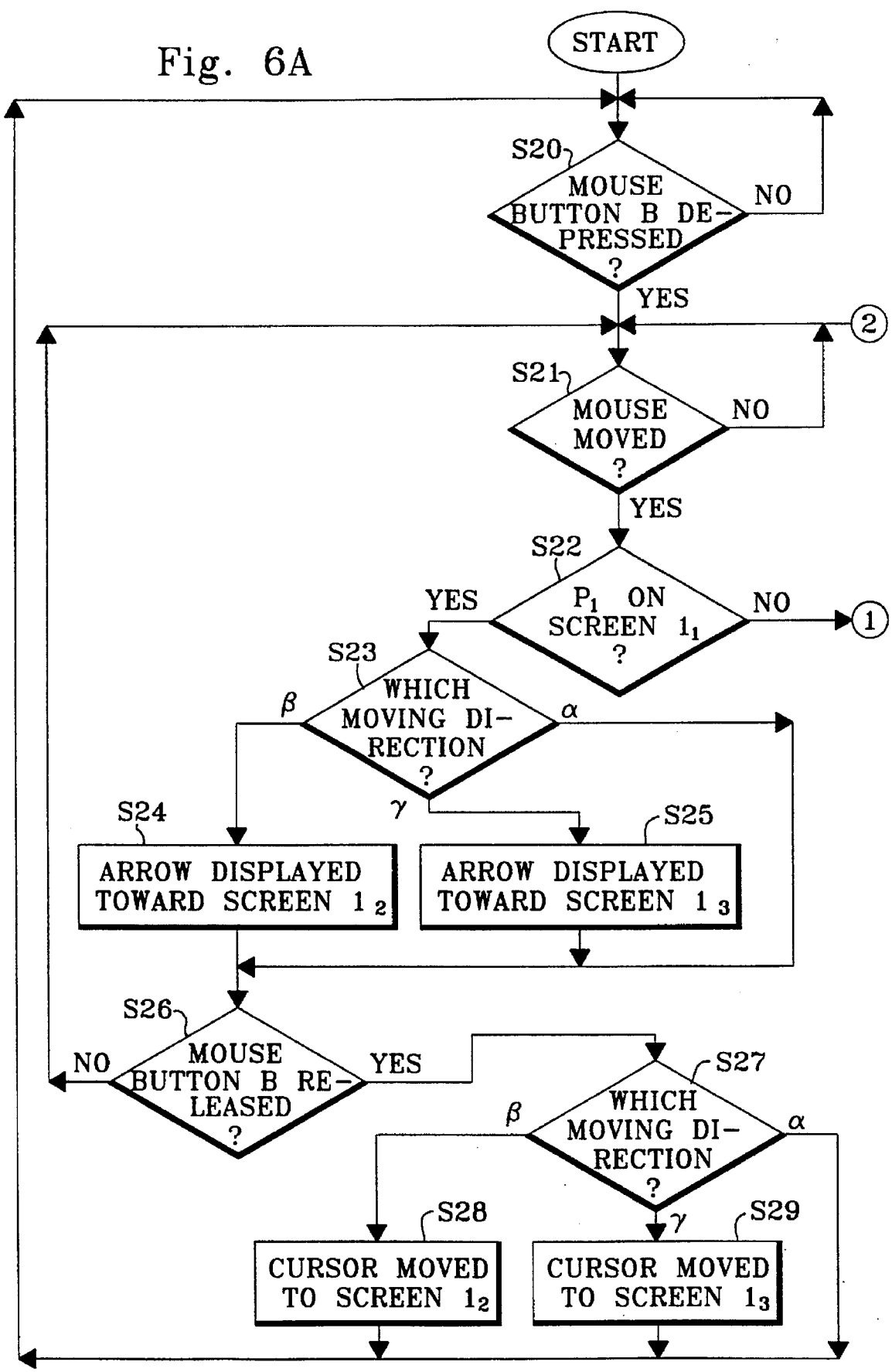
FIG. 6A, 6B and 6C are flowcharts for explaining the actions of the embodiment of this invention.
Figure 6B:
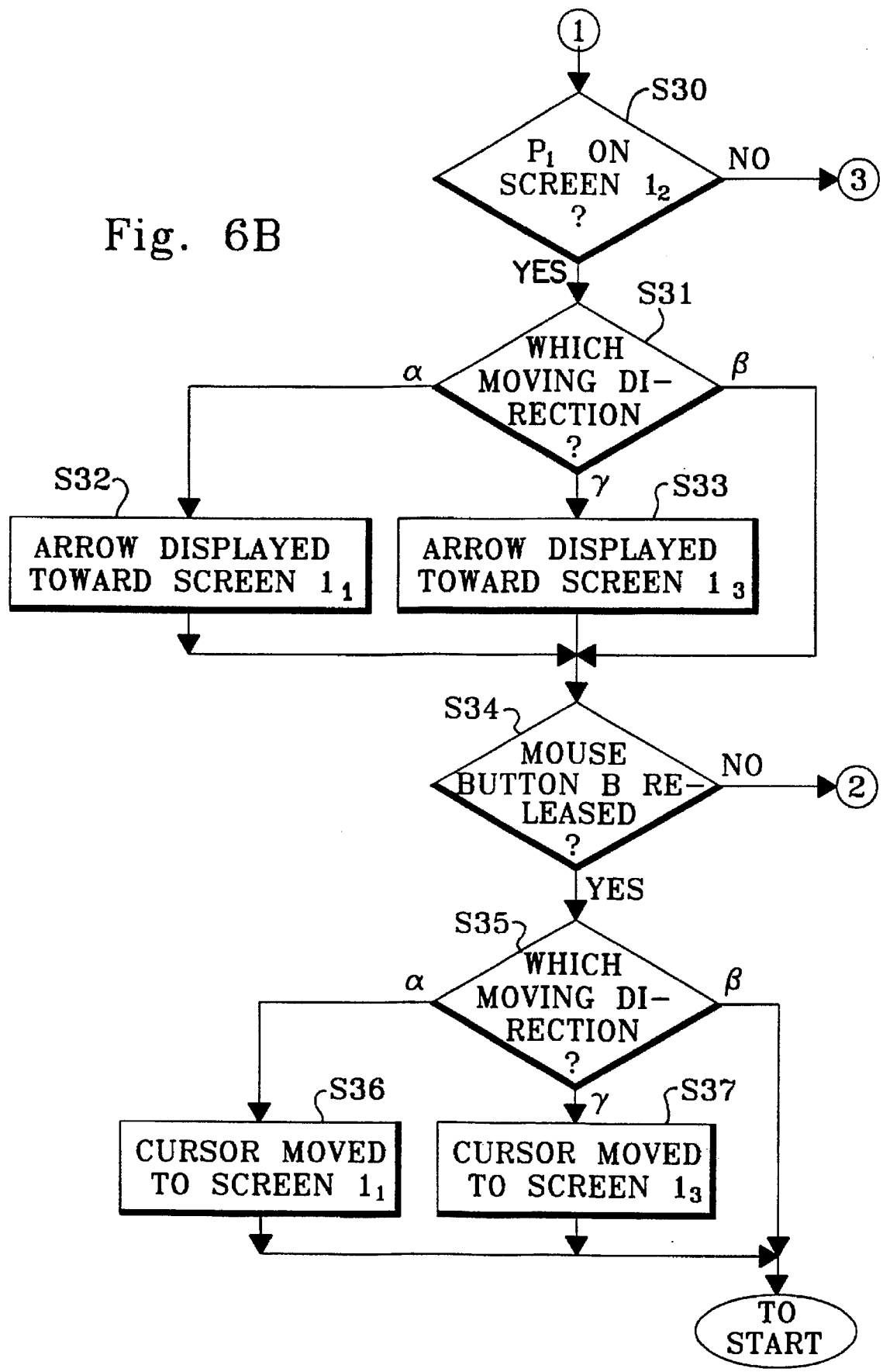
Figure 6C:
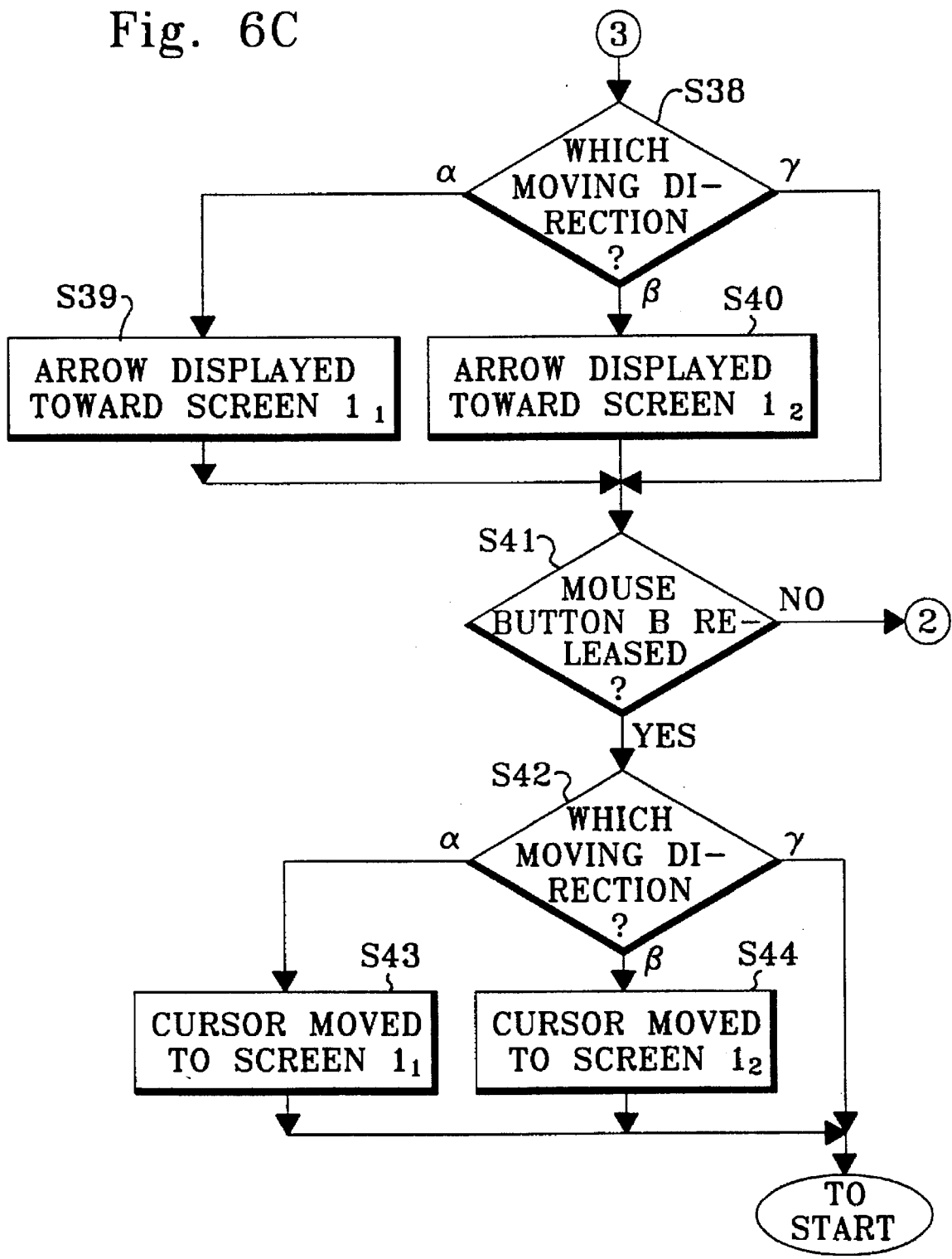

Next, based on the above configuration, the cursor movement actions are mainly explained by referring to the action detail diagrams illustrated as FIGS. 4 and 5, as well as the flowchart illustrated as FIG. 6.

First, when the display system is in an operating state, it is examined whether or not button B of the mouse 2 is depressed (step S20). Until button B is depressed, step S20 is looped to keep the system in a standby status. When button B is depressed in the standby status, the information pertaining to the position $P_1$ of the mouse 2 is sent via the mouse controller 7 to the CPU 4, which stores or memorizes the information on position $P_1$ in the predetermined region of the memory 5.

Next, it is examined whether or not the mouse 2 is moved (step S21) and step S21 is looped to keep the system in a standby status, until the mouse 2 is moved.

In this standby status, if the mouse 2 is moved to position $P_2$ shown in FIG. 4, for example, a signal indicating this move is sent to the CPU 4 through the mouse 2 and the mouse controller 7. Based on the received signal, the CPU 4 examines whether or not position $P_1$ memorized earlier in the memory 5 belongs to screen $1_1$, i.e. whether or not position $P_1$ where button B was depressed is on screen $1_1$ (step S22). If it is determined that it is in fact on screen $1_1$, the CPU 4 examines the direction of movement, i.e. the relative direction of position $P_2$ from the above $P_1$ (step S23).

The judgment of the direction of movement is performed by judging in which one of the tri-split 120 degree fan-like regions, α, β and γ, centered around $P_1$ the position $P_2$ belongs to, as shown in FIG. 5A. The example shown in FIG. 5A shows a case in which position $P_2$ belongs to region β.

FIG. 5B shows data structure table stored in a memory 5. The table designates a relation between split screens $1_1$, $1_2$, and $1_3$, angles (α, β, γ) and center positions of the split screens $(x_1, y_1)$ $(x_2, y_2)$ and $(x_3, y_3)$. Center positions $(x_2, y_2)$ and $(x_3, y_3)$ are respectively designated by $P_3$ and $P_4$.

If the direction of movement is determined to be β in the above step S23, an arrow graphic is displayed with a rubber band image RB from the above position $P_1$ to a predetermined position on screen $1_2$, e.g. the center position $P_3$ (step S24).

Thereby, the operator knows that the cursor moves to screen $1_2$ when he releases the currently depressed button B.

Similarly, if the position $P_2$ is determined to be included in the angle γ and the direction of movement is determined to be γ in the above step S23, the arrow graphic is displayed with the rubber band image RB from the above position $P_1$ to a predetermined position on screen $1_3$, e.g. the center $P_4$ (step S25). On the other hand, if the direction of movement is determined to be α, since the movement requests movement to the current screen, nothing additional is displayed.

Next, it is examined whether or not button B of mouse 2 is released (step S26). If it is determined that button B is not released, the process reverts to step S21 wherefrom similar processes are performed again. Thus, the moved cursor position (screen) displayed once by the arrow graphic can be changed again by a further move of the mouse 2, which causes a change in the arrow graphic of the rubber band image.

Meanwhile, if button B is determined to be released in the above step S26, the cursor moving direction is decided (step S27), and the cursor movement processing is performed in correspondence with the respective moving direction. Since this move is performed by displaying the cursor directly on the target screen without displaying a cursor on the move, the cursor is moved rapidly.

That is, if the direction of movement is β the cursor is moved to screen $1_2$ (step S28), if the direction of movement is γ the cursor is moved to screen $1_3$ (step S29), and if the direction of movement is α the cursor is not moved to anywhere because this is a move within the current screen. After these processes are complete, the process reverts to step S20 and stands by for the next cursor move.

If position $P_1$, where button B of the mouse 2 is depressed, is determined not be on screen $1_1$ in the above step S21, the process branches to step S30. Then, the CPU 4 examines whether or not position $P_1$ stored in the memory 5 belongs to screen $1_2$, i.e. whether or not position $P_1$ is on screen $1_2$ where button B is depressed. If it is determined that position $P_1$ is in fact on screen $1_2$, the direction of movement, i.e. the relative direction of position $P_2$ from the above $P_1$, is examined (step S31).

If the direction of movement is determined to be α, the arrow graphic is displayed with the rubber band image RB from the above position $P_1$ to a predetermined position on screen $1_1$, e.g. the center (step S32). Thereby, the operator knows that the cursor moves to screen $1_1$ when he releases the currently depressed button B.

Similarly, if the direction of movement is determined to be γ in the above step S31, the arrow graphic is displayed with the rubber band image RB from the above position $P_1$ to a predetermined position on screen $1_3$, e.g. the center (step S33). On the other hand, if the direction of movement is determined to be β, since the moving is within the current screen, nothing additional is displayed.

Next, it is examined whether or not button B of mouse 2 is released (step S34). If it is determined that button B is not released, the process reverts to step S21 wherefrom similar processes are performed again. Thus, the moved cursor position (screen) displayed once by the arrow graphic can be changed again by a further move of the mouse 2, which causes a change in the arrow graphic of the rubber band image.

Meanwhile, if button B is determined to be released in the above step S34, the cursor direction of movement is determined (step S35), and the cursor movement processing is performed in correspondence with the respective moving direction. Since this move is performed by displaying the cursor directly on the target screen without displaying a cursor on the move, the cursor is moved rapidly.

That is, if the direction of movement is α the cursor is moved to screen $1_1$ (step S36), if the direction of movement is γ the cursor is moved to screen $1_3$ (step S37), and if the direction of movement is β the cursor is not moved to anywhere because this indicates a move to the current screen. After these processes are complete, the process reverts to step S20 and stands by for the next cursor move.

If position $P_1$, where button B of the mouse 2 is depressed, is determined not be on screen $1_2$ in the above step S30, the process branches to step S38. Then, the CPU 4 examines whether or not position $P_1$ memorized in the memory 5 belongs to screen $1_3$, i.e. whether or not position $P_1$, where button B is depressed, is on screen $1_3$. If it is determined that position $P_1$ is in fact on screen $1_3$, the direction of movement, i.e. the relative direction of position $P_2$ from the above $P_1$, is examined (step S38).

If the direction of movement is determined to be α, the arrow graphic is displayed with the rubber band image RB from the above position $P_1$ to a predetermined position on screen $1_1$, e.g. the center (step S39). Thereby, the operator knows that the cursor moves to screen $1_1$ when he releases the currently depressed button B.

Similarly, if the direction of movement is determined to be β in the above step S38, the arrow graphic is displayed with the rubber band image RB from the above position $P_1$ to a predetermined position on screen $1_3$, e.g. the center (step S40). On the other hand, if the direction of movement is determined to be γ, since the movement is within the current screen, nothing additional is displayed.

Next, it is examined whether or not button B on mouse 2 is released (step S41). If it is determined that button B is not released, the process reverts to step S21 wherefrom similar processes are performed again. Thus, the moved cursor position (screen) indicated on the display once by the arrow graphic can be changed again by a further move of the mouse 2, which causes a change in the arrow graphic of the rubber band image.

Meanwhile, if button B is determined to be released in the above step S41, the cursor moving direction is determined (step S42), and the cursor movement processing is performed in correspondence with the respective moving direction. That is, if the direction of movement is α the cursor is moved to screen $1_1$ (step S43), if the direction of movement is β the cursor is moved to screen $1_2$ (step S44), and if the direction of movement is γ the cursor is not moved to anywhere because this is a move within the current screen. After these processes are complete, the process reverts to step S20 and stands by for the next cursor move.

Since a little move of the mouse 2 determines the cursor moving direction α, β or γ, and the release of button B of the mouse 2 causes the cursor to move to a predetermined position on the target split screen, the mouse only needs to be moved over a short range, and the cursor is moved rapidly.

Furthermore, since the arrow graphic is displayed e.g. with a rubber band image to the predetermined position of the split screen in the cursor moving direction, the operator can confirm the position to which cursor is to be moved. Since an operator can thereby track the fast moving cursor, the operability is excellent.

Although the above embodiment explains cursor moving among three (3) split screens divided from the screen of the graphic display unit 1, the number of screen divisions is not limited to three but instead can be any number. In this case, the same effects and advantages are obtained, if the regions determining the directions of movement (α, β and γ in the above embodiment) are defined to correspond with the number of screen divisions and the positions of the split screens.

Also split screens in the same direction, but different distances may be moved to it the distance of movement as well as the direction of movement are both defined to with regions which correspond to the positions of the split screens.

What is claimed is:

1. A mouse cursor control system for use in a display device in which a display screen is divided into a plurality of split screens and a mouse equipped with a switch means moves a cursor among said plurality of split screens, said mouse cursor control system comprising:

means for defining a plurality of angular sectors of said screen, the origin of said sectors being defined by a first position of said mouse;

means for memorizing said first position of said mouse, when said switch means is depressed;

means for displaying an indicating means connecting said first position with a predetermined position on the split screen, said predetermined position being determined by the angular sector into which said mouse is moved when said mouse is moved from said first position to a second position; and means for moving said cursor to said predetermined position in the split screen pointed to by said indicating means, when said switch means is released.

2. The mouse cursor control system according to claim 1 wherein said indicating means comprises a line.

3. The mouse cursor control system according to claim 1 wherein said line comprises a rubber band.

* * * * *